Figure 1:
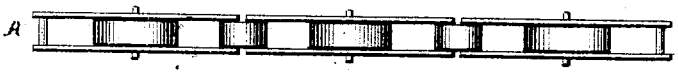

(72.)

WILLIAM B. McCLURE.

Back Chains for Cart Saddles.

No. 4,679. Reissued Dec. 19, 1871.

Witnesses.
C. F. Brown
E. Greenaway

Inventor.
William B. McClure
by H. W. Beadle
Atty

AM. PHOTO-LITHOGRAPHIC CO. N.Y. (OSBORNE'S PROCESS.)

UNITED STATES PATENT OFFICE.

WILLIAM B. McCLURE, OF ALEXANDRIA, VIRGINIA, ASSIGNOR OF TWO-THIRDS INTEREST TO JOHN C. GRAHAM AND H. O. CLAUGHTON.

IMPROVEMENT IN BACK-CHAINS FOR CART-SADDLES.

Specification forming part of Letters Patent No. 119,382, dated September 26, 1871; reissue No. 4,679, dated December 19, 1871.

*To all whom it may concern:*

Be it known that I, WILLIAM B. McCLURE, of Alexandria, in the county of Alexandria and State of Virginia, have invented a new and useful Improvement in Back-Chains for supporting the shafts of a cart or dray, the same being used in the groove of the cart-saddle; and I do hereby declare that the following is a full and exact description of the same, reference being had to the accompanying drawing and to the letters of reference marked thereon.

This invention consists in constructing a chain provided with friction-rollers in such manner that it is adapted for use as a back-chain for supporting the shafts of carts or drays, as will be fully described hereinafter.

In the drawing chains of different construction are represented, any of which may be adapted for use in the manner hereinafter described.

To enable others to put my invention into practice, I will now proceed to fully describe my invention and the manner of using the same.

My invention is designed to ease the movement of the back-chain, which lies in the groove of the cart-saddle and supports the shafts. In the use of carts, drays, or other two-wheeled vehicles a certain portion of the load necessarily rests directly upon the animal's back, and as the position of the load relative to the animal varies constantly with the varying condition of the ground over which the cart is passing it is essential that means should be provided to permit the chain which supports the load to shift its position in harmony with the movements of the cart, in order that the animal may not be exposed to undue strain. For instance, whenever the cart in moving passes over an elevation with one wheel only, one shaft is correspondingly elevated but the other is entirely unaffected. This result therefore follows, that unless the back-chain slips in the groove the entire load resting upon the animal's back is transferred to one side, and it consequently receives a violent wrench to one side or its back is exposed to a twisting strain.

By means of my invention this difficulty is entirely avoided. The back-chain freely slips in the groove of the saddle under all circumstances, and the load consequently always rests squarely upon the animal's back.

A, B, C, D, and E represent different forms of chains provided with rollers, any of which may be employed, as may be desired.

The form of chain is not absolutely essential, but some forms, of course, are much preferred to others.

One method of construction of my chain is as follows: Links of ordinary construction, as shown in Fig. 2, are provided with friction-rollers, which are secured in place by means of a central pin, the links themselves being united by means of short links, as shown.

The other methods of construction are clearly represented in the drawing.

Figure 2:
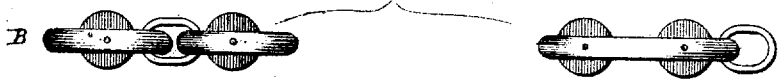
Figure 3:
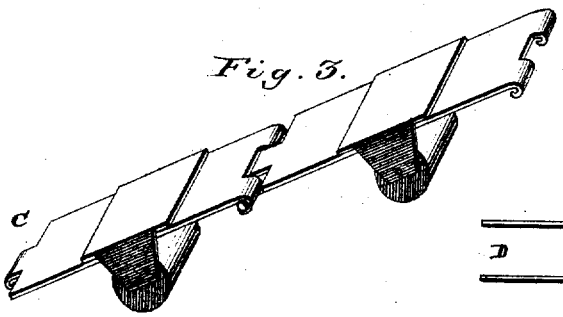
Figure 4:
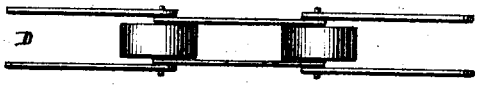
Figure 5:
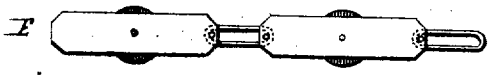
Figure 6:
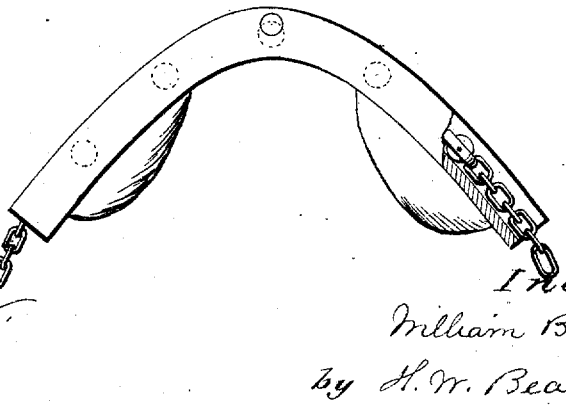

The style of chain represented in Figs. 2 and 5 are especially preferred because from their construction the links are permitted to swing laterally without injury to the chain—a result impossible with some of the forms shown.

It is essential, however, that the chains should be of proper length, that the rollers should be suitably placed, and that the ends of the chain should be adapted for connection to the shafts of a cart or dray.

Having thus fully described my invention, what I now claim as new, and desire to procure by Letters Patent, is—

A back-chain for cart-saddles provided with rollers, substantially as described, as a new article of manufacture.

This specification signed this 18th day of November, 1871.

W. B. McCLURE.

Witnesses:
H. W. BEADLE,
EDM. F. BROWN.

(72)